US012640996B2

(12) United States Patent
Lai et al.

(10) Patent No.: US 12,640,996 B2
(45) Date of Patent: May 26, 2026

(54) DECENTRALIZED NETWORK DEVICE SYSTEM, METHOD, NETWORK CLOUD PACKET FORWARDER, AND READABLE STORAGE MEDIUM

(71) Applicant: Ruijie Networks Co., Ltd., Fuzhou (CN)

(72) Inventors: Ligen Lai, Fuzhou (CN); Xiangdong Jiang, Fuzhou (CN); Danning Lin, Fuzhou (CN); Guohua Huang, Fuzhou (CN)

(73) Assignee: Ruijie Networks Co., Ltd., Fuzhou (CN)

( * ) Notice: Subject to any disclaimer, the term of this patent is extended or adjusted under 35 U.S.C. 154(b) by 0 days.

(21) Appl. No.: 19/225,417

(22) Filed: Jun. 2, 2025

(65) Prior Publication Data

US 2025/0293948 A1     Sep. 18, 2025

Related U.S. Application Data

(63) Continuation of application No. PCT/CN2024/089374, filed on Apr. 23, 2024.

(30) Foreign Application Priority Data

May 8, 2023    (CN) .......................... 202310511065.1

(51) Int. Cl.
 *H04L 41/00*        (2022.01)
 *H04L 41/042*       (2022.01)
          (Continued)
(52) U.S. Cl.
 CPC ............ *H04L 41/30* (2013.01); *H04L 41/042* (2013.01); *H04L 41/0816* (2013.01); *H04L 67/10015* (2022.05)

(58) Field of Classification Search
 None
 See application file for complete search history.

(56) References Cited

U.S. PATENT DOCUMENTS

| 12,199,833 | B2 * | 1/2025 | Zhou | H04L 41/0895 |
| 2017/0141998 | A1 * | 5/2017 | Singh | H04L 12/1854 |

(Continued)

FOREIGN PATENT DOCUMENTS

| CN | 106713005 A | 5/2017 |
| CN | 114124650 A | 3/2022 |
| CN | 114885444 A | 8/2022 |

OTHER PUBLICATIONS

Written Opinion and International Search Report for PCT/CN2024/089374 dated Aug. 7, 2024.

*Primary Examiner* — Mohamed Ibrahim
(74) *Attorney, Agent, or Firm* — ArentFox Schiff LLP; Michael Fainberg

(57) ABSTRACT

Embodiments of this application disclose a decentralized network device system, method, network cloud packet forwarder, and readable storage medium. The system includes: one or more network cloud packet forwarders NCPs, including one or more candidate management NCPs and a primary management NCP, where the one or more candidate management NCPs are determined by the one or more NCPs based on received configuration packets, the primary management NCP is determined from the one or more candidate management NCPs through an election algorithm, and the primary management NCP is configured to centrally process management service packets of the system; and one or more network cloud fabrics NCFs, configured to receive and forward packets from the one or more NCPs, the packets including packets notifying results of the election algorithm and management service packets.

19 Claims, 4 Drawing Sheets

(51) Int. Cl.
*H04L 41/0816* (2022.01)
*H04L 67/1001* (2022.01)

(56) References Cited

U.S. PATENT DOCUMENTS

| | | | |
|---|---|---|---|
| 2021/0194803 A1* | 6/2021 | Zolkover | H04L 45/586 |
| 2022/0191302 A1* | 6/2022 | Krayden | H04L 47/74 |
| 2022/0231947 A1* | 7/2022 | Krayden | H04L 45/7453 |
| 2023/0060758 A1* | 3/2023 | Fedida | H04L 41/0895 |
| 2024/0179047 A1* | 5/2024 | Velez | H04L 49/555 |

* cited by examiner

Receive an incoming packet and query a mapping table of IP addresses and NCPs based on a destination IP address of the incoming packet through a management packet relay module ⟋ 401

Process the incoming packet through a protocol processing module if an NCP corresponding to the destination IP address of the incoming packet is determined to be this NCP ⟋ 402

Send the incoming packet to an NCP corresponding to the destination IP address for processing if the NCP corresponding to the destination IP address of the incoming packet is determined not to be this NCP ⟋ 403

FIG. 4

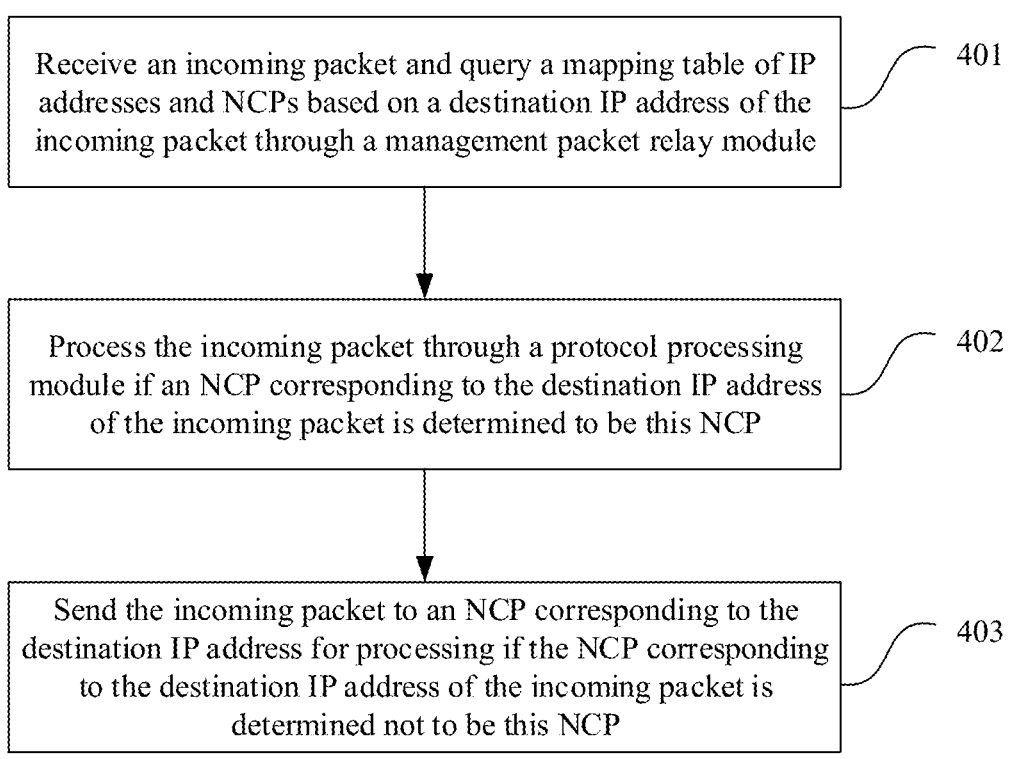

FIG. 5

DECENTRALIZED NETWORK DEVICE SYSTEM, METHOD, NETWORK CLOUD PACKET FORWARDER, AND READABLE STORAGE MEDIUM

CROSS-REFERENCE TO RELATED APPLICATIONS

This application is a continuation of International Application No. PCT/CN2024/089374, filed on Apr. 23, 2024, which claims priority to Chinese Patent Application No. 202310511065.1, filed with the China National Intellectual Property Administration on May 8, 2023, entitled "DECENTRALIZED NETWORK DEVICE SYSTEM, DECENTRALIZED NETWORK CONSTRUCTION METHOD, AND DEVICE", the entire contents of which are incorporated into this application by reference.

TECHNICAL FIELD

This application relates to the field of network communication technology, and particularly to a decentralized network device system, method, network cloud packet forwarder, and readable storage medium.

BACKGROUND

Currently, a decentralized network cloud controller (Network Cloud Controller, NCC) distributed disaggregate chassis (Distributed Disaggregate Chassis, DDC) network system can perfectly address the issue of NCC disconnection in the DDC network system.

SUMMARY

According to a first aspect of this application, a decentralized network device system is provided, including:
    one or more network cloud packet forwarders NCPs, including one or more candidate management NCPs and a primary management NCP, where the one or more candidate management NCPs are determined by the one or more NCPs based on received configuration packets, the primary management NCP is determined from the one or more candidate management NCPs through an election algorithm, and the primary management NCP is configured to centrally process management service packets of the system; and
    one or more network cloud fabrics NCFs, configured to receive and forward packets from the one or more NCPs, the packets including packets notifying results of the election algorithm and management service packets.

In a possible embodiment, the one or more NCPs further include a backup management NCP, the backup management NCP is determined from the one or more candidate management NCPs through the election algorithm and is different from the primary management NCP, and the primary management NCP is further configured to:
    back up management data for managing the one or more NCFs and the one or more NCPs to the backup management NCP.

In a possible embodiment, the management service packets include configuration information of the one or more NCFs and the one or more NCPs, and the primary management NCP is further configured to:
    acquire configuration information of the one or more NCFs and the one or more NCPs in the system; and distribute the configuration information to a new NCP or NCF after determining that the new NCP or NCF has joined.

In a possible embodiment, the management service packets include version files of the one or more NCFs and the one or more NCPs, and the primary management NCP is further configured to:
    receive the version files and send the version files to NCPs to be upgraded and/or NCFs to be upgraded, the NCP to be upgraded being at least one of the one or more NCPs, and the NCF to be upgraded being at least one of the one or more NCFs.

In a possible embodiment, the backup management NCP is further configured to:
    receive the management data from the primary management NCP for backup; and
    switch to become a new primary management NCP upon determining a failure occurrence of the primary management NCP.

In a possible embodiment, the backup management NCP is further configured to:
    send a re-election packet to the one or more candidate management NCPs via an NCF connected to the backup management NCP upon determining a failure occurrence of the primary management NCP, so that the one or more candidate management NCPs determine a new backup management NCP from the one or more candidate management NCPs through the election algorithm.

In a possible embodiment, the primary management NCP is further configured to:
    update a correspondence between an IP address corresponding to the primary management NCP and the primary management NCP to a mapping table of IP addresses and NCPs after being determined as the primary management NCP from the one or more candidate management NCPs; and
    update a correspondence between an IP address corresponding to the new primary management NCP and the new primary management NCP to the mapping table of IP addresses and NCPs after the backup management NCP is switched to become the new primary management NCP.

In a possible embodiment, the one or more NCPs are further configured to:
    separately process control service packets of the one or more NCPs, the control service packets including packets for configuring protocols or controlling the one or more NCFs and the one or more NCPs in the system.

In a possible embodiment, the one or more NCPs include a first NCP, and the first NCP is further configured to:
    receive an incoming packet and determine whether to process the incoming packet by querying a mapping table of IP addresses and NCPs based on a destination internet protocol IP address of the incoming packet; and
    send the incoming packet to an NCP corresponding to the destination IP address for processing if the NCP corresponding to the destination IP address of the incoming packet is determined not to be the first NCP.

According to a second aspect of this application, a decentralized network construction method is provided, applied to a network cloud packet forwarder NCP of a decentralized network device system, the method including:
    receiving a configuration packet and determining a primary management NCP among one or more candidate management NCPs through an election algorithm upon determining, based on the configuration packet, that the NCP itself belongs to the candidate management NCPs; and acquiring an election result and centrally processing management service packets of the system upon determining, based on the election result, that the NCP itself belongs to the primary management NCP.

In a possible embodiment, the method further includes:

acquiring configuration information of one or more NCFs and one or more NCPs in the system;

distributing the configuration information to a new NCP or NCF after determining that the new NCP or NCF has joined; and backing up management data for managing the one or more NCFs and the one or more NCPs in the system to a backup management NCP, the backup management NCP being elected from the one or more candidate management NCPs.

In a possible embodiment, the method further includes:

receiving version files of the one or more NCFs and the one or more NCPs and sending the version files to the corresponding NCPs or NCFs, so that the one or more NCPs or the one or more NCFs complete an upgrade operation based on the version files.

In a possible embodiment, the method further includes:

determining a backup management NCP among multiple candidate management NCPs through an election algorithm upon determining, based on the configuration packet from a management server, that the NCP itself belongs to the candidate management NCPs; and receiving the management data from the primary management NCP for backup upon determining, based on the election result, that the NCP itself belongs to the backup management NCP; and switching to become a new primary management NCP upon determining a failure occurrence of the primary management NCP.

In a possible embodiment, the method further includes:

sending a re-election packet to the one or more candidate management NCPs via an NCF corresponding to the NCP itself upon determining a failure occurrence of the primary management NCP, so that the one or more candidate management NCPs determine a new backup management NCP from the one or more candidate management NCPs through the election algorithm.

In a possible embodiment, the method further includes:

updating a correspondence between an IP address of the primary management NCP and the primary management NCP to a mapping table of IP addresses and NCPs after being determined as the primary management NCP from the one or more candidate management NCPs; and updating a correspondence between an IP address corresponding to a new primary management NCP and the new primary management NCP to the mapping table of IP addresses and NCPs after the backup management NCP is switched to become the new primary management NCP.

In a possible embodiment, the method further includes:

processing control service packets of the one or more NCPs, the control service packets including packets for configuring protocols or controlling the one or more NCFs and the one or more NCPs in the system.

In a possible embodiment, the method further includes:

receiving an incoming packet and determining whether to process the incoming packet by querying a mapping table of IP addresses and NCPs based on a destination IP address of the incoming packet; and

sending the incoming packet to an NCP corresponding to the destination IP address for processing if the NCP corresponding to the destination IP address of the incoming packet is determined not to be this NCP.

According to a third aspect of this application, a network cloud packet forwarder NCP is provided, including:

a processor and a memory;

where the memory is configured to store instructions executable by the processor; and the processor is configured to execute the instructions to implement the decentralized network construction method as described in the second aspect above.

According to a fourth aspect of this application, a computer-readable storage medium is provided, where a computer program executable by a computer is stored therein, and when the program runs on the computer, the computer executes the decentralized network construction method as described in the second aspect above.

According to a fifth aspect of this application, a decentralized network device system is provided, the system including: multiple network cloud fabrics NCFs and multiple network cloud packet forwarders NCPs;

each NCF being configured to receive and forward packets from the NCPs, the packets including election result packets and management service packets; and each NCP being configured to execute an election algorithm through an election module to determine a primary management NCP among multiple candidate management NCPs upon determining, based on a configuration packet from a management server, that the NCP itself belongs to the candidate management NCPs; and centrally process management service packets of the system through a protocol processing module upon determining, based on an election result from the election module, that the NCP itself belongs to the primary management NCP.

In a possible embodiment, the primary management NCP is further configured to:

acquire configuration information of NCFs and NCPs in the system;

distribute the configuration information to a new NCP or NCF after determining that the new NCP or NCF has joined;

and back up management data for managing NCFs and NCPs in the system to a backup management NCP, the backup management NCP being elected from the multiple candidate management NCPs.

In a possible embodiment, the primary management NCP is further configured to:

receive version files from the management server and send the version files to the corresponding NCPs or NCFs, so that the NCPs or NCFs complete an upgrade operation based on the version files.

In a possible embodiment, each NCP is further configured to:

execute an election algorithm through an election module to determine a backup management NCP among multiple candidate management NCPs upon determining, based on a configuration packet from the management server, that the NCP itself belongs to the candidate management NCPs; and receive the management data from the primary management NCP for backup upon determining, based on the election result from the election module, that the NCP itself belongs to the backup management NCP; and switch to become a new primary management NCP upon determining a failure occurrence of the primary management NCP.

In a possible embodiment, the backup management NCP is further configured to:

send a re-election packet to remaining candidate management NCPs, excluding the primary management NCP and the backup management NCP, via an NCF upon determining a failure occurrence of the primary management NCP, so that the remaining candidate management NCPs execute an election algorithm through an election module to determine a new backup management NCP among the remaining candidate management NCPs.

In a possible embodiment, each NCP is further configured to:

process control service packets of each NCP through a protocol processing module, the control service packets being packets for configuring protocols or controlling NCFs and NCPs in the system.

In a possible embodiment, each NCP is further configured to:

receive an incoming packet and query a mapping table of IP addresses and NCPs based on a destination IP address of the incoming packet through a management packet relay module;

process the incoming packet through a protocol processing module if the NCP corresponding to the destination IP address of the incoming packet is determined to be this NCP; and send the incoming packet to an NCP corresponding to the destination IP address for processing if the NCP corresponding to the destination IP address of the incoming packet is determined not to be this NCP.

In a possible embodiment, each NCP is further configured to:

send a primary management IP corresponding to the primary management NCP to a management packet relay module through an election module after determining the primary management NCP, so that the management packet relay module sets an NCP corresponding to the primary management IP in a mapping table of IP addresses and NCPs as the primary management NCP;

and send a new primary management IP corresponding to a new primary management NCP to the management packet relay module through the election module after a primary-backup switchover, so that the management packet relay module updates an NCP corresponding to the primary management IP in the mapping table of IP addresses and NCPs.

According to a sixth aspect of this application, a decentralized network construction method is provided, applied to a network cloud packet forwarder NCP of a decentralized network device system, the method including:

receiving a configuration packet from a management server and executing an election algorithm through an election module to determine a primary management NCP among multiple candidate management NCPs upon determining, based on the configuration packet, that the NCP itself belongs to the candidate management NCPs; and acquiring an election result from the election module and centrally processing management service packets of the system through a protocol processing module upon determining, based on the election result, that the NCP itself belongs to the primary management NCP.

In a possible embodiment, the method further includes:

acquiring configuration information of NCFs and NCPs in the system;

distributing the configuration information to a new NCP or NCF after determining that the new NCP or NCF has joined;

and backing up management data for managing NCFs and NCPs in the system to a backup management NCP, the backup management NCP being elected from the multiple candidate management NCPs.

According to a seventh aspect of this application, a decentralized network construction apparatus is provided, applied to a network cloud packet forwarder NCP of a decentralized network device system, the apparatus including:

an election module configured to receive a configuration packet from a management server and execute an election algorithm through the election module to determine a primary management NCP among multiple candidate management NCPs upon determining, based on the configuration packet, that the NCP itself belongs to the candidate management NCPs; and a management module configured to acquire an election result from the election module and centrally process management service packets of the system through a protocol processing module upon determining, based on the election result, that the NCP itself belongs to the primary management NCP.

According to an eighth aspect of this application, an electronic device is provided, including:

a processor and a memory;

the memory being configured to store instructions executable by the processor; and the processor being configured to execute the instructions to implement the decentralized network construction method as described in the second aspect above.

According to a ninth aspect of this application, a computer-readable storage medium is provided, where, when instructions in the computer-readable storage medium are executed by a processor of an electronic device, the electronic device is enabled to execute the decentralized network construction method as described in the second aspect above.

According to a tenth aspect of this application, a computer program product is provided, including a computer program:

the computer program, when executed by a processor, implements the decentralized network construction method as described in the second aspect above.

Other features and advantages of this application will be set forth in the following description, and partly become apparent from the description, or be understood by implementing this application. The objectives and other advantages of this application can be achieved and obtained through the structures particularly pointed out in the written description, claims, and drawings.

BRIEF DESCRIPTION OF DRAWINGS

To more clearly illustrate the technical solutions of the embodiments of this application, a brief introduction to the drawings required for use in the embodiments of this application is provided below. Obviously, the drawings introduced below are merely some embodiments of this application, and those of ordinary skill in the art can obtain other drawings based on these drawings without creative effort.

FIG. 4 is a schematic flowchart of steps for an NCP to execute packet relaying provided by an embodiment of this application;

FIG. 5 is a schematic diagram of a packet relaying process provided by an embodiment of this application;

DESCRIPTION OF EMBODIMENTS

To make the objectives, technical solutions, and advantages of the embodiments of this application clearer, the technical solutions in the embodiments of this application are described clearly and completely below in conjunction with the drawings in the embodiments of this application. The described embodiments are a part of the embodiments of this application, not all embodiments. Based on the embodiments in this application, all other embodiments obtained by those of ordinary skill in the art without creative effort fall within the protection scope of this application.

In the description of the embodiments of this application, unless otherwise specified, "/" means "or", for example, A/B may mean A or B; "and/or" in the text is merely an association relationship describing associated objects, indicating that three relationships may exist, for example, A and/or B may mean: A exists alone, A and B exist simultaneously, and B exists alone. Additionally, in the description of the embodiments of this application, "multiple" means two or more than two.

Hereinafter, the terms "first" and "second" are used for descriptive purposes only and cannot be understood as implying or suggesting relative importance or implicitly indicating the number of technical features indicated. Thus, features defined with "first" or "second" may explicitly or implicitly include one or more of the features. In the description of the embodiments of this application, unless otherwise specified, "multiple" means two or more.

In cases where "include", "have", and "contain" are described in this application, unless explicit limiting terms such as "only" or "consist of" are used, another component may also be added. Unless mentioned to the contrary, terms in the singular form may include the plural form and cannot be understood as being limited to a quantity of one.

Figure 1:
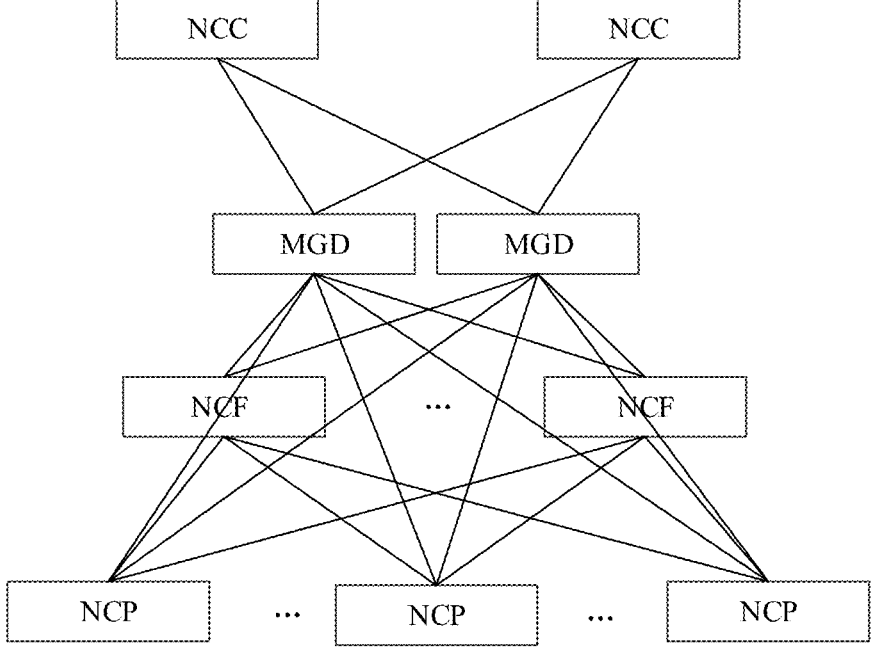
FIG. 1 is a schematic diagram of a framework of a DDC system in the related art.

DDC is a distributed disaggregate chassis network device system designed based on an application specific integrated circuit (Application Specific Integrated Circuit, ASIC) chip. This system is based on original rack network devices (such as switches or routers; for ease of understanding, switches are used as examples below), where the management board, line cards, and fabric (Fabric) cards are made into physically independent devices, the chassis of the rack switch is removed, and they are connected via cables to form a logical rack switch, as shown in FIG. 1.

In the traditional DDC, an NCC replaces the original management board, an NCF replaces the original fabric board, and a network cloud packet forwarder (Network Cloud Packet Forwarder, NCP) replaces the original line card. A management device (Management Device, MGD)

relays connections between the NCC and the network cloud fabric (Network Cloud Fabric, NCF) or NCP, meaning that the NCC and NCP/NCF are connected through the management device.

Thus, the DDC forms a rack system that can be flexibly expanded and deployed. Traditional rack switches are limited by the number of chassis slots, cabinet power supply, and cabinet size, supporting a maximum of 16 line cards currently, whereas the DDC system can support 96 or even more line cards (referred to as NCPs in the DDC architecture).

Meanwhile, the DDC uses ASIC chips, leveraging features such as credit scheduling, backplane cell switching, and VOQ (Virtual Output Queue, virtual output queue) to achieve a network architecture with stable latency and high bandwidth utilization. However, when forwarding between NCPs, NCP1 needs to know the specific egress of NCP2 to perform cross-NCP forwarding, which prevents them from being fully managed as individual box devices. Therefore, traditional solutions typically abstract the DDC system logically into a single rack device for management.

After physically separating the management board and line cards/fabric boards in the DDC system, the number of failure points increases. For example, the network between the NCC and NCP/NCF may experience disconnection due to multiple single-point failures. Once the NCC loses connection, the entire DDC system becomes uncontrollable. The DDC system needs to integrate 100-500 NCPs, with a network scale dozens of times larger than traditional rack devices, resulting in an excessively large failure radius that is unacceptable in most customer scenarios.

To address the issue of system uncontrollability caused by NCC disconnection, a decentralized DDC network system has evolved.

The decentralized DDC network system includes the following features:

1. In terms of networking, the NCC is removed, leaving only NCPs and NCFs, with each NCP providing a management configuration interface externally and processing control protocol packets in a distributed manner, such as address resolution protocol (Address Resolution Protocol, ARP) packets;

2. Global entries, such as media access control (Media Access Control, MAC), ARP, and routing, are originally aggregated and distributed by the NCC to each NCP, now each NCP directly synchronizes entries it generates to other NCPs; and 3. Information synchronization (such as global entries, NCP devices, and port information) between NCP devices, originally achieved through the management device and NCC, is changed to directly use the fabric card channel.

Thus, the decentralized (NCC-removed) DDC network system can resolve the issue of NCC disconnection. However, without the NCC aggregating information from each device, maintenance and management require logging into different NCPs and NCFs separately, significantly increasing the complexity of maintenance and management, mainly reflected in the following aspects:

1. Diagnostic data are scattered across different devices;

2. Viewing data or issuing configurations requires logging into all NCPs and NCFs individually for operations;

3. After collecting diagnostic data from all devices, some data need to be aggregated and calculated to obtain correct results (for example, statistics for an egress queue require summing the statistics data from all NCPs where the ingress is located); and 4. Version upgrades require individual operations on each NCP and NCF.

In view of this, various exemplary embodiments of this application provide a decentralized network device system, a decentralized network construction method, and a device to address the issue of complex maintenance and management in the decentralized DDC network system of the related art.

The concept of a possible embodiment of this application may be summarized as follows: multiple network cloud fabrics NCFs and multiple network cloud packet forwarders NCPs form a decentralized network device system; where each NCP includes an election module and a protocol processing module, each NCF is configured to receive and forward packets from the NCPs; each NCP is configured to execute an election algorithm through the election module to determine a primary management NCP among multiple candidate management NCPs upon determining, based on a configuration packet from a management server (for example, the aforementioned management device), that the NCP itself belongs to the candidate management NCPs (in other words, the candidate management NCPs may be determined by the one or more NCPs based on the received configuration packet, meaning the configuration packet is used by the NCP receiving the configuration packet to determine whether the NCP itself belongs to the candidate management NCPs); and centrally process management service packets of the system through the protocol processing module upon determining, based on an election result from the election module, that the NCP itself belongs to the primary management NCP (that is, centralized management may be defined as the primary management NCP being configured to centrally process all management service packets from the one or more NCPs and the one or more NCFs of the system). The embodiments of this application, based on the decentralized DDC system, use the elected primary management NCP to aggregate and manage the management service packets of each device in the DDC system, eliminating the need to log into different NCPs and NCFs for device maintenance and management, thereby reducing the complexity of maintenance and management of the decentralized DDC system and improving the usability of system maintenance and management.

After introducing the main inventive concepts of the embodiments of this application, a brief introduction to the application scenarios to which the technical solutions of the embodiments of this application may be applied is provided below. It should be noted that the application scenarios introduced below are only for illustrating the embodiments of this application and are not limiting. In specific implementations, the technical solutions provided by the embodiments of this application may be flexibly applied according to actual needs.

To facilitate understanding of the decentralized network device system provided by the embodiments of this application, further explanations are provided below in conjunction with the drawings.

Figure 2:
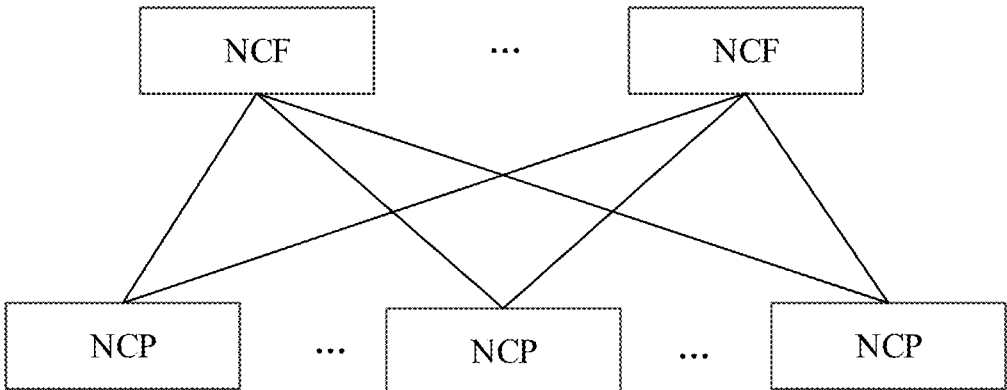
FIG. 2 is a schematic diagram of a framework of a decentralized network device system provided by an embodiment of this application.

In a possible embodiment, an embodiment of this application provides a decentralized network device system, which pertains to a DDC network. FIG. 2 is a schematic diagram of a framework of a decentralized network device system provided by an embodiment of this application, where the network device system includes multiple network cloud fabrics NCFs and multiple network cloud packet forwarders NCPs, where each NCF is configured to receive and forward packets from the NCPs; each NCP includes an election module and a protocol processing module, configured to execute an election algorithm through the election module to determine a primary management NCP among multiple candidate management NCPs upon determining, based on a configuration packet from a management server, that the NCP itself belongs to the candidate management NCPs; and centrally process management service packets of the system through the protocol processing module upon determining, based on an election result from the election module, that the NCP itself belongs to the primary management NCP.

It should be added that the candidate management NCPs can directly obtain the election result from the election module to determine whether they belong to the primary management NCP; and the election result is forwarded through the NCF in the form of an election result packet, so that all NCPs except the candidate management NCPs can also know the election result.

In a possible embodiment, as shown in the decentralized network device system in FIG. 2, each NCP is further configured to: process control service packets of each NCP through the protocol processing module.

Figure 3:
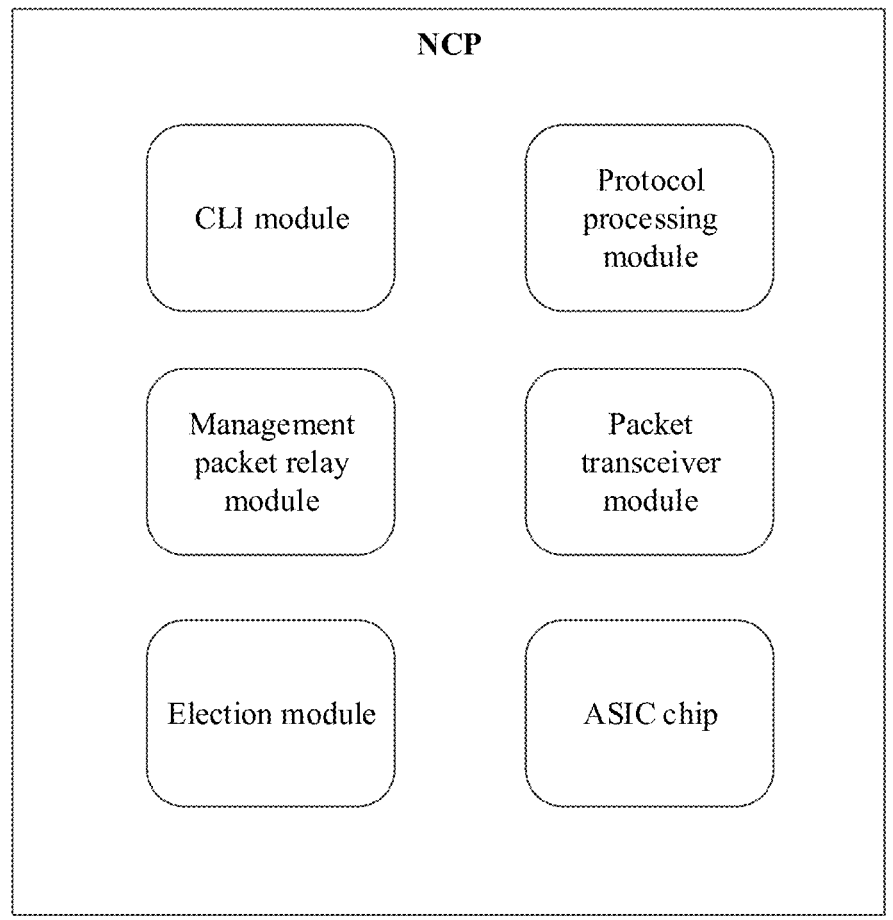
FIG. 3 is a schematic diagram of a structure of an NCP provided by an embodiment of this application.

It should be added that a schematic diagram of the structure of each NCP in the embodiments of this application is shown in FIG. 3. The NCP includes: a command line interface (Command Line Interface, CLI) module, an election module, a management packet relay module, a packet transceiver module, a protocol processing module, and an ASIC chip, where the CLI module is configured to configure an IP address of the NCP, the election module is configured to elect a primary management NCP, the packet transceiver module is configured to receive and forward packets within the NCP, the protocol processing module is configured to process management service packets of the system, the management packet relay module is configured to relay incoming packets, which may be packets sent from the management server, and the ASIC chip is configured to receive and forward packets from other NCPs and the management server.

In the NCP of the above decentralized network device system, the difference from the NCP in the related art lies at least in that in the embodiments of this application, an election module is added to the NCP to elect a primary management NCP, and the elected primary management NCP aggregates and manages the management service packets of each device in the DDC system, eliminating the need to log into different NCPs and NCFs for device maintenance and management, thereby reducing the complexity of maintenance and management of the decentralized DDC system.

This application resolves the contradiction between reliability and usability in the decentralized DDC network system through a separation of management and control, that is, by centrally processing management services less affected by centralized control point failures (such as configuration distribution, fault diagnosis, and upgrades), corresponding to the step of centrally processing management service packets of the system through the primary management NCP, where the management service packets are packets for configuration distribution, fault diagnosis, system upgrades, or managing NCFs and NCPs in the system; and by distributedly processing control plane service packets significantly affected by centralized control point failures (such as packets for address resolution protocol ARP and configuring border gateway protocol BGP). This corresponds to the step of independently processing control service packets of the system through each NCP, where the control service packets are packets for configuring protocols and/or controlling NCFs and NCPs in the system.

In a possible embodiment, the primary management NCP centrally processing management service packets of the system includes the following:

acquire configuration information of NCFs and NCPs in the system; the configuration information comprises information that enables the devices to operate normally, such as global entry information;

distribute the configuration information to a new NCP or NCF after determining that the new NCP or NCF has joined;

back up management data for managing NCFs and NCPs in the system to a backup management NCP; and receive version files from the management server and send the version files to the corresponding NCPs or NCFs, so that the NCPs or NCFs complete an upgrade operation based on the version files.

It should be noted that the backup management NCP is elected from multiple candidate management NCPs. When logging into the primary management NCP device and executing an upgrade command, the embodiments of this application provide three flexible upgrade methods, including upgrading a single specified NCP/NCF device, upgrading multiple specified devices, and one-click upgrading all devices across the network, meeting the upgrade needs of different scenarios.

In a possible embodiment, the specific process of each NCP electing a backup management NCP from multiple candidate management NCPs includes:

each NCP executes an election algorithm through an election module to determine a backup management NCP among multiple candidate management NCPs upon determining, based on a packet from the management server, that the NCP itself belongs to the candidate management NCPs; and receive the management data from the primary management NCP for backup upon determining, based on the election result from the election module, that the NCP itself belongs to the backup management NCP; and switch to become a new primary management NCP upon determining a failure occurrence of the primary management NCP.

It should be added that, based on the same principle of determining whether a candidate management NCP belongs to the primary management NCP, the candidate management NCP can also directly obtain the election result from the election module to determine whether the NCP itself belongs to the backup management NCP; and the election result is forwarded through the NCF in the form of an election result packet, so that all NCPs except the candidate management NCPs can also know the election result.

Before each NCP executes the election of the primary management NCP and the backup management NCP, in the embodiments of this application, the candidate management NCPs first need to be determined. The process of determining the candidate management NCPs is as follows: First, determine the candidate management NCPs participating in the election, for example, selecting 3 NCPs out of 100 NCPs to be configured as candidate management NCPs. To avoid network-wide interruption issues during system version upgrades, NCPs need to be upgraded in batches. Therefore, the candidate management NCPs need to be distributed across different upgrade batches. In the embodiments of this application, candidate management NCPs can be automatically polled and selected (or randomly selected) from the median of NCP device numbers toward both greater and less than the median, or users can specify candidate management NCPs through configuration. An example of automatic polling selection is as follows: Assuming 100 NCPs numbered from 1 to 100, starting from the median number 50, select one NCP numbered 49 forward, then one NCP numbered 51 backward, then one NCP numbered 48 forward, then one NCP numbered 52 backward, and so on, until the number of candidate management NCPs reaches the expected number. If the expected number is 3, select NCPs numbered 49, 50, and 51.

After determining the candidate management NCPs, the election modules of the candidate management NCPs automatically determine which NCP serves as the primary management NCP and which serves as the backup management NCP among the candidate management NCPs, with the remaining NCPs continuing as candidate management NCPs. There are various mature algorithms in the industry for specific election rules, such as the bully algorithm and ring algorithm, and other algorithms are not elaborated in this embodiment.

Since the more NCPs participate in the election, the higher the complexity and the longer the time required, the embodiments of this application address the difficulty of all NCPs participating in the election decision by designating a small number of candidate management NCPs as described above.

In a possible embodiment, the backup management NCP is further configured to:

send a re-election packet to remaining candidate management NCPs, excluding the primary management NCP and the backup management NCP, via an NCF upon determining a failure occurrence of the primary management NCP, so that the remaining candidate management NCPs execute an election algorithm through an election module to determine a new backup management NCP among the remaining candidate management NCPs.

When the primary management NCP fails, the backup management NCP switches to become a new primary management NCP, and the election module re-elects one NCP from the remaining candidate management NCPs as the backup management NCP, avoiding system paralysis due to the failure of the primary management NCP and improving system usability.

When managing the DDC system through in-band management, a situation may arise where the management server accesses NCP2, but the primary management NCP is NCP1. At this time, packets from the management server communicating with the primary management NCP are first sent to the CPU of NCP2. In the embodiments of this application, a management packet relay module is added to each NCP, as shown in FIG. 3 above, which can resolve the issue of cross-NCP in-band remote management by relaying packets through the management packet relay module of NCP2 to NCP1. Those skilled in the art can understand that in-band management is a network management method where management control information of the network and bearer service information of the user network are transmitted through the same logical channel.

In a possible embodiment, each NCP executes packet relaying steps, the process of which is shown in FIG. 4, including the following steps:

Step 401. Receive an incoming packet and query a mapping table of IP addresses and NCPs based on a destination IP address of the incoming packet through a management packet relay module. The incoming packet may be a management packet.

Step 402. Process the incoming packet through a protocol processing module if an NCP corresponding to the destination IP address of the incoming packet is determined to be this NCP.

Step 403. Send the incoming packet to an NCP corresponding to the destination IP address for processing if the NCP corresponding to the destination IP address of the incoming packet is determined not to be this NCP.

For example, a schematic diagram of the packet relaying process is shown in FIG. 5. NCP2 receives a packet from the management server requesting access to NCP1 and sends the request packet to the CPU of NCP2 (the CPU includes modules such as the election module and management packet relay module). NCP2 finds that the destination IP address of the access is an IP address of another NCP. The management packet relay module queries a mapping table of IP addresses and NCPs based on the destination IP address of the request packet, determines that the NCP corresponding to the destination IP address of the request packet is NCP1, and relays the packet to the CPU of NCP1. After NCP1 receives the request packet, the NCP discovers that the accessed IP address is the management address of this NCP and processes the request packet through the protocol processing module.

In another possible embodiment, each NCP is further configured to:

send a primary management IP corresponding to the primary management NCP to a management packet relay module through an election module after determining the primary management NCP, so that the management packet relay module sets an NCP corresponding to the primary management IP in a mapping table of IP addresses and NCPs as the primary management NCP; and send a new primary management IP corresponding to a new primary management NCP to the management packet relay module through the election module after a primary-backup switchover, so that the management packet relay module updates an NCP corresponding to the primary management IP in the mapping table of IP addresses and NCPs.

It should be noted that before the election module executes the election steps, the NCP corresponding to the primary management IP is empty by default. After the election module selects the primary management NCP, the election module notifies the management packet relay module to update the NCP corresponding to the primary management IP to the primary management NCP. After a primary-backup switchover, the election module notifies the management packet relay module to update the NCP corresponding to the new primary management IP in the mapping table of IP addresses and NCPs to the new primary management NCP.

Based on the above decentralized network device system, an embodiment of this application further provides a decentralized network construction method, applied to a network cloud packet forwarder NCP of the above decentralized network device system, including the following:

receiving a configuration packet from a management server and executing an election algorithm through an election module to determine a primary management NCP among multiple candidate management NCPs upon determining, based on the configuration packet, that the NCP itself belongs to the candidate management NCPs; and acquiring an election result from the election module and centrally processing management service packets of the system through a protocol processing module upon determining, based on the election result, that the NCP itself belongs to the primary management NCP.

In a possible embodiment, the method further includes:

acquiring configuration information of NCFs and NCPs in the system;

distributing the configuration information to a new NCP or a new NCF after determining that the new NCP or NCF has joined; and backing up management data for managing NCFs and NCPs in the system to a backup management NCP, the backup management NCP being elected from the multiple candidate management NCPs.

Figure 6:
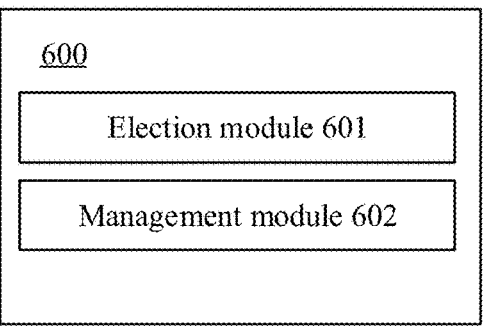
FIG. 6 is a schematic diagram of a structure of a decentralized network construction apparatus 600 provided by an embodiment of this application.

Based on the same inventive concept, an embodiment of this application further provides a decentralized network construction apparatus, applied to a network cloud packet forwarder NCP of the above decentralized network device system, as shown in FIG. 6, the apparatus 600 including:

an election module 601 configured to receive a configuration packet from a management server and execute an election algorithm through the election module to determine a primary management NCP among multiple candidate management NCPs upon determining, based on the configuration packet, that the NCP itself belongs to the candidate management NCPs; and a management module 602 configured to acquire an election result from the election module and centrally process management service packets of the system through a protocol processing module upon determining, based on the election result, that the NCP itself belongs to the primary management NCP.

In summary, in an optional embodiment of this application, based on the decentralized DDC system, an elected primary management NCP is used to aggregate and manage the management service packets of each device in the DDC system, eliminating the need to log into different NCPs and NCFs for device maintenance and management, thereby reducing the complexity of maintenance and management of the decentralized DDC system and improving the usability of system maintenance and management.

An electronic device 130 according to an embodiment of this application is described below with reference to FIG. 7. The electronic device 130 shown in FIG. 7 is merely an example and should not impose any limitations on the functions and scope of use of the embodiments of this application.

Figure 7:
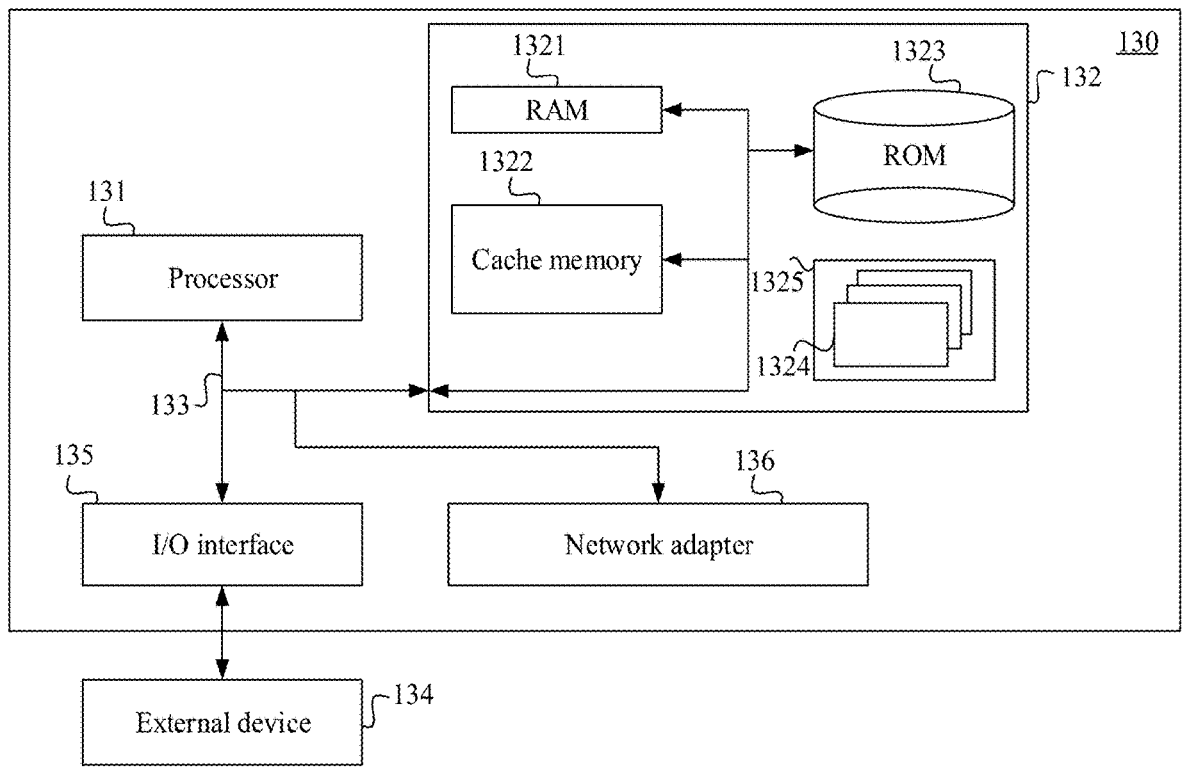
FIG. 7 is a schematic diagram of a structure of an electronic device provided by an embodiment of this application.

As shown in FIG. 7, the electronic device 130 is presented in the form of a general-purpose electronic device. Components of the electronic device 130 may include, but are not limited to: at least one processor 131 mentioned above, at least one memory 132 mentioned above, and a bus 133 connecting different system components (including the memory 132 and the processor 131).

The bus 133 represents one or more of several types of bus structures, including a memory bus or memory controller, a peripheral bus, a processor, or a local bus using any of a variety of bus structures.

The memory 132 may include readable media in the form of non-volatile storage media or volatile memory, such as random access memory (RAM) 1321 and/or cache memory 1322, and may further include read-only memory (ROM) 1323.

The memory 132 may also include a program/utility 1325 having a set (at least one) of program modules 1324, such program modules 1324 including, but not limited to: an operating system, one or more application programs, other program modules, and program data, each or some combinations of these examples possibly including an implementation of a network environment.

The electronic device 130 may also communicate with one or more external devices 134 (for example, keyboard, pointing device, and the like), communicate with one or more devices that enable a user to interact with the electronic device 130, and/or communicate with any device (for example, router, modem, and the like) that enables the electronic device 130 to communicate with one or more other electronic devices. Such communication may be performed through an input/output (I/O) interface 135. Furthermore, the electronic device 130 may also communicate with one or more networks (for example, a local area network (LAN), a wide area network (WAN), and/or a public network, such as the Internet) through a network adapter 136. As shown in the figure, the network adapter 136 communicates with other modules of the electronic device 130 via the bus 133. It should be understood that, although not shown in the figure, other hardware and/or software modules may be used in conjunction with the electronic device 130, including, but not limited to: microcode, device drivers, redundant processors, external disk drive arrays, RAID systems, tape drives, and data backup storage systems.

In an exemplary embodiment, this application also provides a computer-readable storage medium including instructions, such as the memory 132 including instructions, the instructions being executable by the processor 131 of the electronic device 130 to complete the decentralized network construction method described above. Optionally, the computer-readable storage medium may be a non-transitory computer-readable storage medium, for example, the non-transitory computer-readable storage medium may be ROM, random access memory (RAM), CD-ROM, magnetic tape, floppy disk, optical data storage device, and the like.

In an exemplary embodiment, a computer program product is also provided, including a computer program, the computer program, when executed by the processor 131, implementing the decentralized network construction method as provided by this application.

Those skilled in the art should understand that the embodiments of this application may be provided as a method, system, or computer program product. Therefore, this application may take the form of an entirely hardware embodiment, an entirely software embodiment, or an embodiment combining software and hardware aspects. Moreover, this application may take the form of a computer program product implemented on one or more computer-usable storage media (including, but not limited to, disk storage, CD-ROM, optical storage, and the like) containing computer-usable program code.

This application is described with reference to flowcharts and/or block diagrams of methods, devices (systems), and computer program products according to this application. It should be understood that each process and/or block in the flowcharts and/or block diagrams, and combinations of processes and/or blocks in the flowcharts and/or block diagrams, may be implemented by computer program instructions. These computer program instructions may be provided to a processor of a general-purpose computer, special-purpose computer, embedded processor, or other programmable data processing device to produce a machine, such that the instructions executed by the processor of the computer or other programmable data processing device produce a device for implementing the functions specified in one or more processes of the flowchart and/or one or more blocks of the block diagram.

These computer program instructions may also be stored in a computer-readable memory capable of directing a computer or other programmable data processing device to operate in a specific manner, such that the instructions stored in the computer-readable memory produce an article of manufacture including an instruction device, the instruction device implementing the functions specified in one or more processes of the flowchart and/or one or more blocks of the block diagram.

These computer program instructions may also be loaded onto a computer or other programmable data processing device, causing a series of operational steps to be performed on the computer or other programmable device to produce a computer-implemented process, such that the instructions executed on the computer or other programmable device provide steps for implementing the functions specified in one or more processes of the flowchart and/or one or more blocks of the block diagram.

Obviously, those skilled in the art can make various modifications and variations to this application without departing from the spirit and scope of this application. Thus, if these modifications and variations of this application fall within the scope of the claims of this application and their equivalents, this application is also intended to encompass these modifications and variations.

What is claimed is:

1. A decentralized network device system comprising:
   one or more network cloud packet forwarders (NCPs), comprising one or more candidate management NCPs and a primary management NCP, wherein the one or more candidate management NCPs are determined by the one or more NCPs based on received configuration packets, the primary management NCP is determined from the one or more candidate management NCPs through an election algorithm, and the primary management NCP is configured to centrally process a management service packet of the system for maintenance and management of the system; and
   one or more network cloud fabrics (NCFs), configured to receive and forward a packet from the one or more NCPs, wherein the packet comprises a packet notifying results of the election algorithm and a management service packet;
   wherein the decentralized network device system is provided without a network cloud controller (NCC);
   wherein the one or more NCPs are further configured, respectively, to:
   process a control service packet for the one or more NCPs in a distributed manner, wherein the control service packet is a packet for configuring protocols and/or controlling the one or more NCFs and the one or more NCPs in the decentralized network device system.

2. The system according to claim 1, wherein the one or more NCPs further comprise a backup management NCP, the backup management NCP is determined from the one or more candidate management NCPs through the election algorithm and is different from the primary management NCP, and the primary management NCP is further configured to:
   back up management data for managing the one or more NCFs and the one or more NCPs to the backup management NCP.

3. The system according to claim 2, wherein the backup management NCP is further configured to:
   receive the management data from the primary management NCP for backup; and switch to become a new primary management NCP upon determining a failure occurrence of the primary management NCP.

4. The system according to claim 3, wherein the backup management NCP is further configured to:

send a re-election packet to the one or more candidate management NCPs via an NCF connected to the backup management NCP upon determining a failure occurrence of the primary management NCP, so that the one or more candidate management NCPs determine a new backup management NCP from the one or more candidate management NCPs through the election algorithm.

5. The system according to claim 3, wherein the primary management NCP is further configured to:

update a correspondence between an IP address corresponding to the primary management NCP and the primary management NCP to a mapping table of IP addresses and NCPs after being determined as the primary management NCP from the one or more candidate management NCPs; and update a correspondence between an IP address corresponding to the new primary management NCP and the new primary management NCP to the mapping table of IP addresses and NCPs after the backup management NCP is switched to become the new primary management NCP.

6. The system according to claim 1, wherein the management service packet comprise configuration information of the one or more NCFs and the one or more NCPs, and the primary management NCP is further configured to:

acquire configuration information of the one or more NCFs and the one or more NCPs in the system; and distribute the configuration information to a new NCP or NCF after determining that the new NCP or NCF has joined.

7. The system according to claim 1, wherein the management service packet comprises version files for the one or more NCFs and the one or more NCPs, and the primary management NCP is further configured to:

receive the version files and send the version files to an NCP to be upgraded and/or an NCF to be upgraded, wherein the NCP to be upgraded is at least one of the one or more NCPs, and the NCF to be upgraded is at least one of the one or more NCFs.

8. The system according to claim 1, wherein the one or more NCPs comprise a first NCP, and the first NCP is further configured to:

receive an incoming packet and determine whether to process the incoming packet by querying a mapping table of IP addresses and NCPs based on a destination internet protocol IP address of the incoming packet; and send the incoming packet to an NCP corresponding to a destination IP address for processing when the NCP corresponding to the destination IP address of the incoming packet is determined not to be the first NCP.

9. The system according to claim 1, wherein a quantity of the one or more candidate management NCPs is less than a quantity of the one or more NCPs.

10. The system according to claim 1, wherein the management service packet is a packet for configuration distribution, fault diagnosis, system upgrades, or managing NCFs and NCPs in the system.

11. A decentralized network construction method, applied to a network cloud packet forwarder (NCP) of one or more NCPs of a decentralized network device system further comprising one or more network cloud fabrics (NCFs), the method comprising:

receiving a configuration packet and determining a primary management NCP among one or more candidate management NCPs through an election algorithm upon determining, based on the configuration packet, that the NCP itself belongs to the candidate management NCPs; and acquiring an election result and centrally processing management service packets of the system for maintenance and management of the system upon determining, based on the election result, that the NCP itself belongs to the primary management NCP;

wherein the decentralized network device system is provided without a network cloud controller (NCC);

wherein the method comprises:

processing a control service packet for the one or more NCPs in a distributed manner, wherein the control service packet is a packet for configuring protocols and/or controlling the one or more NCFs and the one or more NCPs in the decentralized network device system.

12. The method according to claim 11, further comprising:

acquiring configuration information of one or more network cloud fabrics (NCFs) and one or more NCPs in the system;

distributing the configuration information to a new NCP or NCF after determining that the new NCP or NCF has joined; and backing up management data for managing the one or more NCFs and the one or more NCPs in the system to a backup management NCP, wherein the backup management NCP is elected from the one or more candidate management NCPs.

13. The method according to claim 12, further comprising:

updating a correspondence between an IP address of the primary management NCP and the primary management NCP to a mapping table of IP addresses and NCPs after being determined as the primary management NCP from the one or more candidate management NCPs; and updating a correspondence between an IP address corresponding to a new primary management NCP and the new primary management NCP to the mapping table of IP addresses and NCPs after the backup management NCP is switched to become the new primary management NCP.

14. The method according to claim 11, further comprising:

determining a backup management NCP among multiple candidate management NCPs through an election algorithm upon determining, based on the configuration packet from a management server, that the NCP itself belongs to the candidate management NCPs; and receiving the management data from the primary management NCP for backup upon determining, based on the election result, that the NCP itself belongs to the backup management NCP; and switching to become a new primary management NCP upon determining a failure occurrence of the primary management NCP.

15. The method according to claim 14, further comprising:

sending a re-election packet to the one or more candidate management NCPs via an NCF corresponding to the NCP itself upon determining a failure occurrence of the primary management NCP, so that the one or more candidate management NCPs determine a new backup management NCP from the one or more candidate management NCPs through the election algorithm.

16. The method according to claim 11, further comprising:

receiving version files of the one or more NCFs and the one or more NCPs and sending the version files to the corresponding NCPs or NCFs, so that the one or more NCPs or the one or more NCFs complete an upgrade operation based on the version files.

17. The method according to claim 11, further comprising:

receiving an incoming packet and determining whether to process the incoming packet by querying a mapping table of IP addresses and NCPs based on a destination IP address of the incoming packet; and sending the incoming packet to an NCP corresponding to the destination IP address for processing when the NCP corresponding to the destination IP address of the incoming packet is determined not to be this NCP.

18. A network cloud packet forwarder NCP comprising:

a processor and a memory;

wherein the memory is configured to store instructions executable by the processor; and the processor is configured to execute the instructions to implement the decentralized network construction method according to claim 11.

19. A non-transitory computer-readable storage medium, wherein a computer program executable by a computer is stored therein, and when the program runs on the computer, the computer executes the method according to claim 11.

* * * * *